United States Patent Office 3,621,735
Patented Nov. 23, 1971

3,621,735
ELECTRONICALLY OPERATED HYDRAULIC CONTROLS
George E. Lemieux, Livonia, Mich., assignor to Ford Motor Company, Dearborn, Mich.
Filed Dec. 15, 1969, Ser. No. 885,160
Int. Cl. B60k 17/04; F16h 5/50
U.S. Cl. 74—753                 8 Claims

ABSTRACT OF THE DISCLOSURE

A pressure regulator valve system for an automatic control valve circuit in a multiple ratio power transmission comprising a pressure regulator valve situated in the valve circuit with a pressure source, an electrical pulse valve which establishes a predetermined pressure on a movable valve element of the regulator valve, the magnitude of the pressure being determined by the frequency of electrical voltage pulses applied to the pulse valve, the frequency in turn being controlled by electronic sensors that measure transmission output shaft speed and power input shaft torque.

GENERAL DESCRIPTION OF THE INVENTION

The improvements of my invention can be adapted to be used in a multiple ratio power transmission mechanism in an automative vehicle driveline with an internal combustion engine. The transmission mechanism may be similar to the one disclosed in U.S. Pat. No. 3,393,585, which is assigned to the assignee of my invention. That transmission includes a hydrokinetic torque converter having an impeller that is connected to the drive shaft of an internal combustion engine. The turbine of the converter, which is situated in radial fluid flow relationship with respect to the impeller, is connected through a forward drive friction clutch to the power input element of a planetary gear unit. The output element of the planetary gear unit is connected to the driven shaft, which in turn is connected to the traction wheels for the vehicle through a suitable differential and axle assembly. A low speed ratio reaction brake for the gear unit complements the action of the forward clutch to establish low speed ratio operation. operation. An intermediate speed ratio brake and a direct-and-reverse clutch can be used with the previously described reaction brake and forward clutch to establish two additional forward driving speed ratios as well as a reverse drive ratio. The clutches and the brakes are actuated and released by fluid pressure operated servos. The control system of my invention selectievly distributes pressure from a fluid pressure source, such as an engine-driven, positive-displacement pump, to each of the servos. The control system has extraneous voltage signal sources including an electronic transmission shaft speed indicator and a torque signal source that produces an electrical signal that is proportional to engine intake manifold pressure. The signals are distributed to a control module which in turn selectively distributes control signals to each of several solenoid operated shift valves, the latter in turn controlling distribution of pressure from the pressure source to the servos. The electronic module also senses the operating mode selected by the operator and develops a pressure regulator valve signal that influences the pulse rate of the pulse valve. In this way the regulated line pressure for any operating mode and any operating condition within that operating mode is of an optimum value so that the torque requirements are satisfied as well as the shift timing and shift quality during speed ratio changes.

PARTICULAR DESCRIPTION OF THE INVENTION

Figure 1:
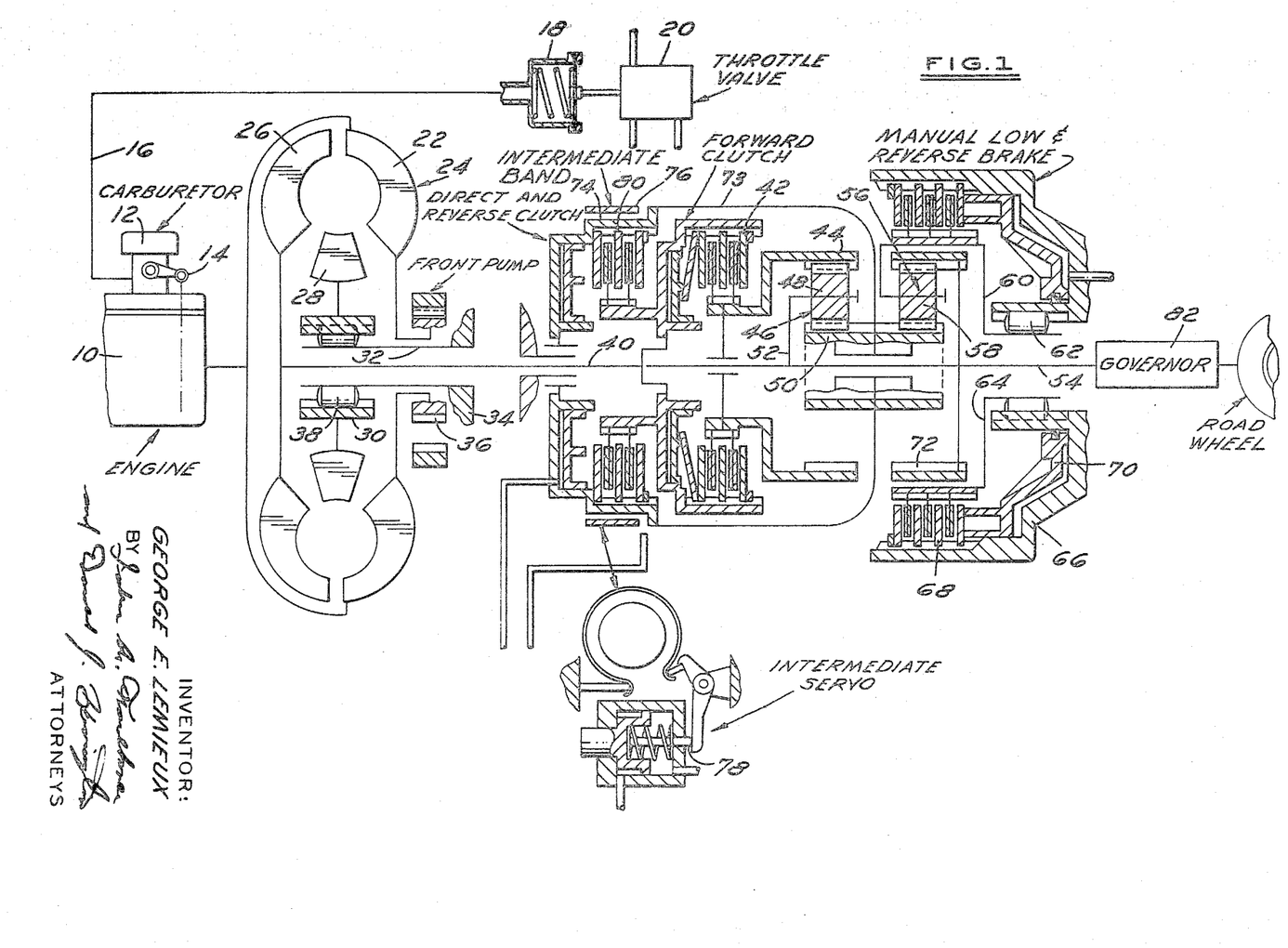
FIG. 1 shows a schematic assembly view of torque transmitting elements in a power transmission mechanism adapted to use the control system of my invention.

In FIG. 1, numeral 10 designates an internal combustion engine. It includes an intake manifold which is supplied with an air-fuel mixture by carburetor 12. The throttle valve in the throat of the carburetor is actuated by a throttle valve lever 14. The pressure in the manifold on the downstream side of the throttle valve is connected through manifold pressure line 16 to the manifold pressure servo 18, which in turn actuates a throttle valve 20. This in turn is adapted to develop a voltage signal that is functionally related in magnitude to the pressure in the intake manifold.

The crankshaft of the engine 10 is connected to the impeller 22 of a hydrokinetic torque converter 24. The converter includes also a turbine 26 situated in toroidal fluid flow relationship with respect to the impeller 22. Stator 28 is located between the flow exit region of the turbine and the flow entrance region of the impeller. It includes flow-directing blades supported by hub 30 which in turn defines the outer race of an overrunning brake. The hub is supported by stationary sleeve shaft 32 which is secured to a portion 34 of the transmission housing.

Impeller 22 is drivably connected to the input gear element of positive displacement gear pump 36. This is used as a control pressure source for my control circuit, which will be described with reference to FIG. 3.

The brake for the stator includes one-way brake elements 38 which prevent rotation of the stator in a direction opposite to the direction of rotation of the impeller, but which permit free-wheeling motion of the stator with the impeller during coupling operation.

Turbine 26 is connected drivably to turbine shaft 40, which in turn is connected by means of forward clutch 42 to the power input ring gear element 44 of a first simple planetary gear unit 46. Gear unit 46 includes also pinions 48 which engage drivably sun gear 50. Pinions 48 are journaled rotatably on carrier 52, which is connected directly to power output shaft 54.

Sun gear 50 is common to a second simple planetary gear unit 56. This gear unit includes pinions 58 journaled rotatably on the carrier 60.

An overrunning brake 62 is situated between the carrier 64 and the housing portion 66. Carrier 64 journals rotatably the pinions 58. It is adapted to be anchored to the housing 66 by a selectively engageable disc brake 68, which is actuated and released by annular piston 70 slidably situated in a cooperating cylinder portion of the housing 66.

Ring gear 72 of the planetary unit 56 is connected directly to power output shaft 54.

Sun gear 50 is connected by means of a drive shell 73 to drum 74 about which is positioned brake band 76. This band is applied to establish intermediate speed ratio operation, a suitable fluid pressure operated intermediate brake band servo 78 being provided for this purpose.

A direct-and-reverse clutch disc assembly 80 is adapted to connect selectively the shaft 40 with the drive shell 73 and the sun gear 50.

The driven shaft speed of the output shaft 50 is sensed by a suitable electronic governor 82 which is connected directly to the shaft 54.

To establish low speed ratio forward drive, the forward clutch is applied. Turbine torque then is distributed through the clutch 42 to the ring gear 44. Carrier 64 acts as a reaction member since it is anchored against the housing by the overrunning brake shown in part at 62. The torque on the ring gear 44 develops a positive driving torque on the carrier 52 and on the power output shaft 54. The resistance of the output shaft to rotation causes reverse motion of the sun gear 50. This in turn imparts a forward driving torque to the ring gear 72 as the carrier 64 serves as a reaction member. A split torque delivery path thus is established through the planetary gearing.

To establish an intermediate speed ratio drive condition, brake band 76 is applied while the forward clutch remains applied. Sun gear 50 now serves as a reaction point as torque from the turbine is distributed to the ring gear 44 through the forward-drive clutch. Carrier 52 acts as the sole output member since the carrier 64 now freewheels.

A ratio change to the direct, forward-drive condition is established by engaging simultaneously both clutches and releasing the brakes. The elements of the planetary gear unit thus are locked together for rotation in unison, as a direct 1 to 1 driving connection is established between the turbine and the output shaft 54.

Manual low speed ratio operation is established by engaging the forward clutch and applying the low-and-reverse brake 68. This permits driving torque to be distributed from the carrier 64 to the housing in each direction rather than in one direction only. Brake 68 thus complements the action of the overrunning brake 62.

Reverse drive operation is achieved by disengaging the forward drive clutch and engaging the direct-and-reverse clutch 80. The brake 68 also is applied so that the carrier 64 may act as a reaction member. Torque now is distributed directly through the clutch 80 to the sun gear 50. With the carrier 64 acting as a reaction point, the ring gear 72 and the output shaft 54, to which it is connected, are driven in a reverse direction.

Figure 2:
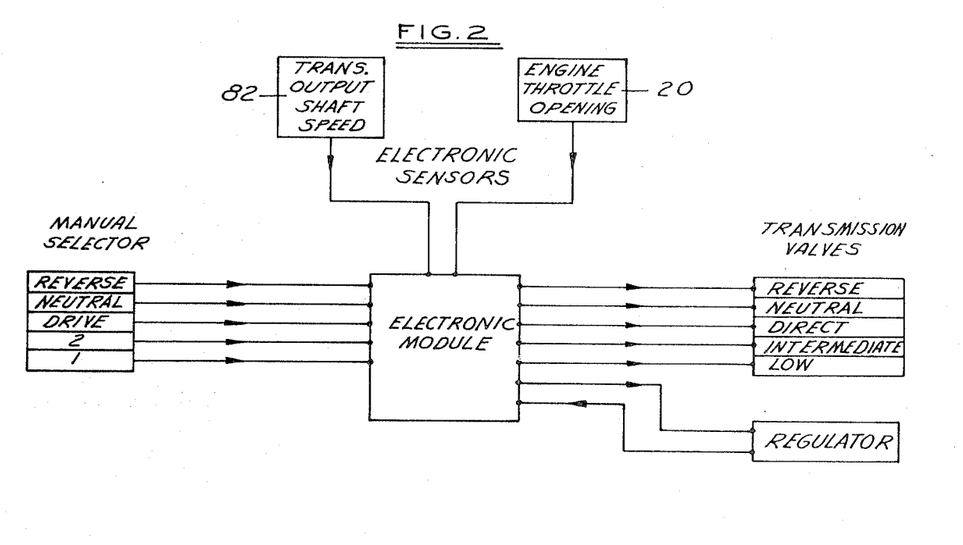
FIG. 2 is a block diagram of the electronic control system of my invention.

In FIG. 2 I have illustrated in block diagram form the circuit functions performed by the electronic control module. The module receives an input signal from the transmission output shaft driven governor 82 as well as from the transmission throttle valve 20. A manual selector valve, which is under the control of the vehicle operator, can choose any of the driving modes that is desired; namely, reverse, neutral, drive [fully automatic range], second [continuous operation in the second ratio] and first [continuous operation in the low ratio]. The signal distributed to the electronic control module by the manual selector valve is a third input signal that is summed or integrated by the module as the various functional output signals are developed. Five signals for the shift valves are developed by the module depending upon the relative magnitudes of the three input signals. These signals respectively actuate the valves for reverse, neutral, direct, intermediate and low which will be described with reference to FIG. 3. The module develops also a signal that is capable of controlling the pulse frequency of the pulse valve associated with the regulator to be described with reference to FIG. 3.

Figure 3:
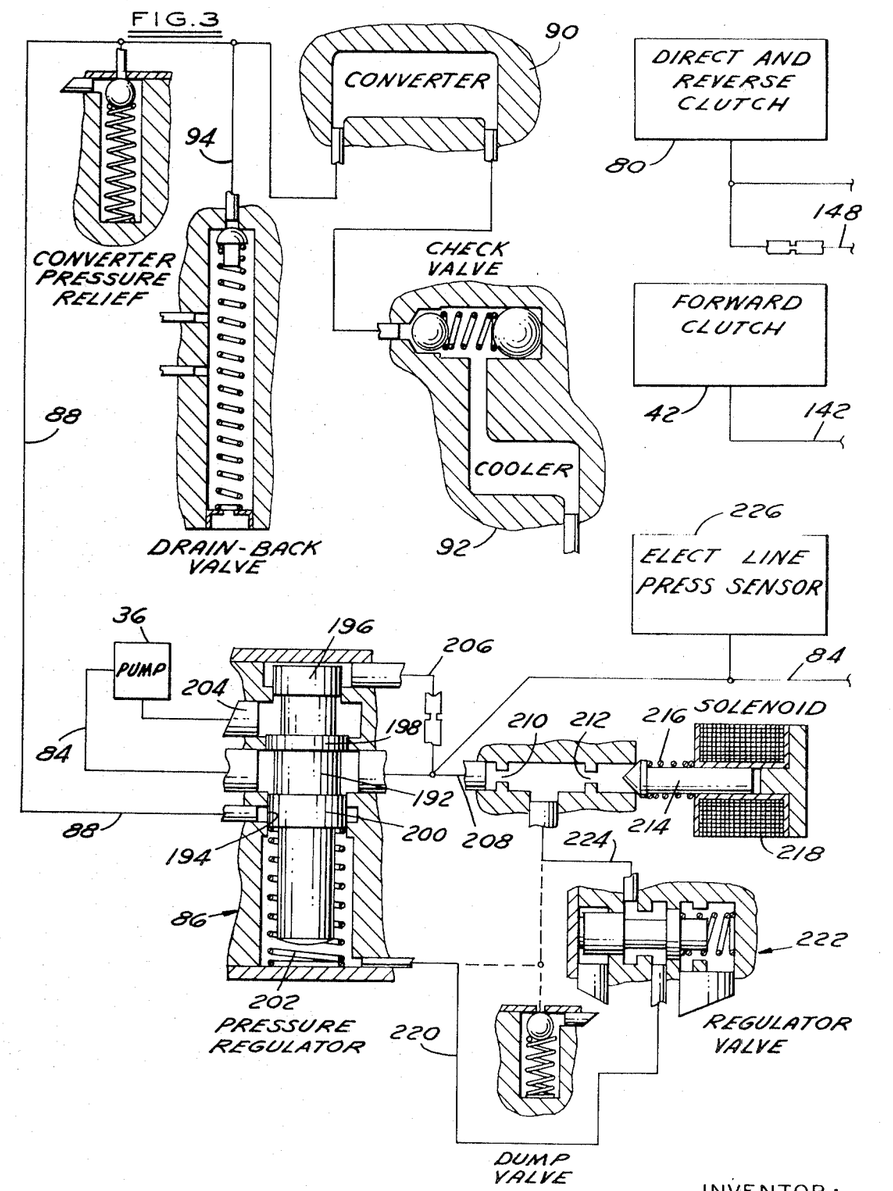
FIGS. 3 and 3A show an automatic transmission control system including the improvements of my invention.

Line pressure passage 84 extends from the pump 36 to a pressure regulator valve identified generally by reference character 86. The low pressure side of the valve communicates through passage 88 with the converter feed pasage 90. The downstream side of the converter communicates with the cooler 92 through a one-way check valve, the cooler in turn communicating with the various lubrication points in the transmission system. The oil, after passing through the lubrication points, retuurns to the oil sump where it again is picked up by the intake of the pump 36. Other lubrication points in the transmission system are served by a second lubrication passage 94.

The shift controlling function of the transmission system is performed by three spool valves identified respectively by reference characters 96, 98 and 100. Valve 96 comprises a movable valve element 102 having spaced valve lands 104, 106, 108 and 110. Valve lands 106 through 110 are of equal diameter. Valve element 102 is urged normally in the left hand direction by valve spring 112. The valve is slidably situated in valve chamber 114 which is provided with internal valve lands that register with the spaced valve lands of the element 102.

Passage 84 communicates with the valve chamber 114. When the valve element 102 is positioned as shown, land 108 blocks passage 84. Passage 84 communicates also with valve chamber 116 and 118 for the valves 98 and 100 respectively. Valve 98 includes a valve element 120 having spaced valve lands 122, 124 and 126. Valve element 120 is urged normally in the left hand direction by valve spring 128. Internal valve lands are formed in the chamber 116 which register with the lands of the valve element 120.

Valve 100 comprises valve element 130 which has spaced valve lands 132, 134, 136 and 138. Valve spring 140 normally urges the valve element 130 in the left hand direction. Valve chamber 118 also is formed with internal valve lands which register with the external valve lands of the valve element 132.

The passage 142 extends from the forward clutch to the valve chamber 114 at a location directly adjacent land 108. Passage 142 communicates through the valve chamber 114 with passage 144, which in turn communicates with passage 146 extending to the apply side of the intermediate servo 78.

Passage 148 extends from the direct clutch to the valve chamber 114 at a location adjacent land 110. When the valve element 102 is positioned as shown, communication is established through the chamber 114 with crossover passage 150, the latter extending to valve chamber 116 of the valve 98. When the valve element 120 is positioned as shown, communication is established through the valve chamber 116 between passage 150 and exhaust port 152. Communication also is established at that time between passage 150 and cross-over passage 154, the latter extending to valve chamber 118 at a location adjacent land 136. When the valve element 130 is positioned as shown, communication is established through the valve chamber 118 between passage 154 and passage 146. Communication is established also at that time between exhaust port 156 and feed passage 158 extending to the low-and-reverse brake 68.

Valve 96 is actuated by solenoid valve 160. This includes a valve element 162 located in the core of solenoid windings 164. A flow restricting passage 166 communicates with the valve chamber 168 of the solenoid valve 160 and extends to the line pressure passage 84. Valve element 162 normally is urged in a right hand direction by valve spring 170, which causes the valve element 162 normally to seal the passage 166. When the solenoid windings 164 are actuated, valve element 162 is moved in the left hand direction to open the passage 166 thereby establishing communication between passage 166 and signal pressure passage 172. This extends to the left hand side of the valve land 104 so that a valve actuating force can be developed on the land 104 to shift the valve element 102 in a right hand direction.

Valves 98 and 100 are provided also with solenoid valve actuators corresponding to solenoid valve 160. These valves are identified respectively by reference characters 174 and 176. Valve 174 includes a movable valve element 178, which is spring-urged in a right hand direction to close restricted flow passage 180 which communicates with the line pressure passage 84. When the valve element 178 is positioned as shown, passage 180 is blocked. When the solenoid valve 174 is actuated, communication is established between passage 180 and the signal passage 182 which communicates with the left hand side of the valve land 122. In a similar fashion, valve 176 includes a movable valve element 184 which is adapted, when positioned as shown, to block restricted flow passage 186 which communicates with the control pressure passage 84. When the solenoid windings for valve 176 are energized, valve element 184 is shifted to establish communication between passage 186 and signal passage 188, the latter communicating with the left hand side of the valve land 132 of the valve element 130.

An intermediate servo pressure modulator 190 is situated in and partly defines passage 146. Reference may be made to Patent 3,400,612 for a particular description of shift modifying valves such as that shown at 190. A particular description of this valve will not be repeated here.

The valves 96, 98 and 100 can be actuated selectively by selectively energizing the solenoids for the valves 160, 174 and 176. To establish low speed ratio operation, solenoid valve 160 is energized. This causes valve element 102 to shift in a right hand direction while the other two valves remain positioned as shown. Communication now is established between passage 84 and passage 142, which extends to the forward clutch. Clutch 82, servo 78 and brake 68 are not applied since their respective feed passages are exhausted. Passage 146 is exhausted through the chamber 118, through passage 154 and through exhaust port 152. Passage 158 is exhausted through the exhaust port 156 in the chamber 118.

To condition the transmission mechanism for a speed ratio change to the intermediate speed ratio, solenoid valves 160 and 174 are energized. Both of the valve elements 102 and 120 now are shifted in a right hand direction. Pressurized passage 84 now communicates through the chamber 116 with the passage 154. This passage in turn communicates with the passage 146 through the valve chamber 118 thereby causing the apply side of the servo to become pressurized.

Direct drive operation is achieved by energizing solenoid valve 174 while the other solenoid valves are de-energized. Pressure now is distributed from passage 84 through the chamber 116 to the passage 150 and is distributed through chamber 114 through the passage 148 to the direct drive clutch. Pressure is distributed also from passage 84 to the passage 154 through the chamber 116. It then passes through valve chamber 118 to passage 144 and then through chamber 114 to the passage 142 thus pressurizing the forward drive clutch. The apply side of the intermediate servo 78 also is pressurized since passage 146 is pressurized, but the servo is released because the release side is pressurized simultaneously with the application of the direct drive clutch. The force produced by the pressure on the release side of the servo exceeds a force produced by the pressure on the apply side of the servo.

Reverse drive is obtained by energizing simultaneously solenoid valves 174 and 176. Control pressure then is distributed directly from the passage 84 to the passage 158 through the valve chamber 118. Pressure is distributed also from passage 84, through the chamber 116 to the passage 150 which extends through the valve chamber 114 to the feed passage 148 for the direct and reverse clutch.

Figure 3A:
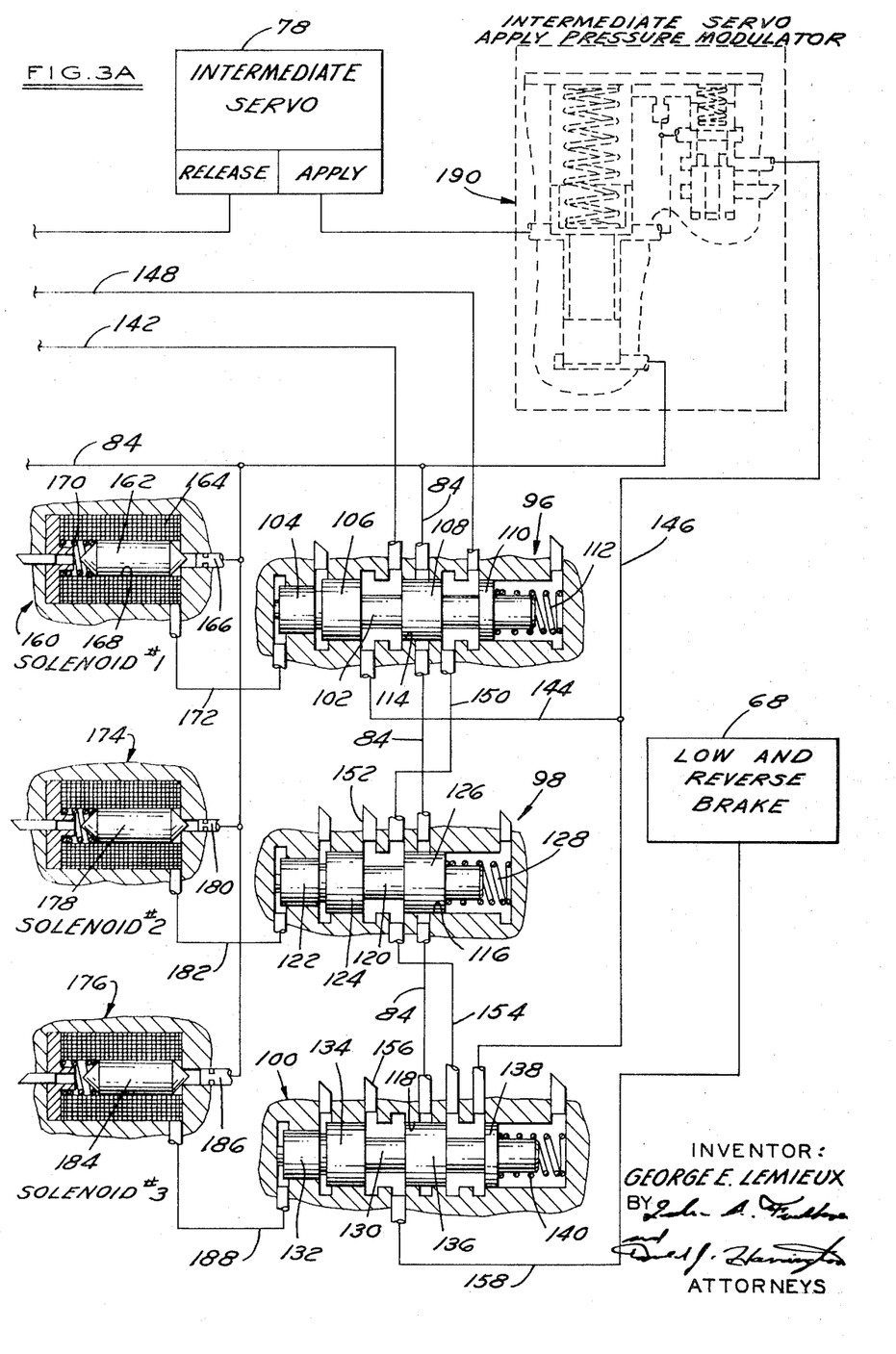

Line pressure regulation for the circuit is obtained by regulator valve 86. This includes a main valve element 192 slidably situated in valve chamber 194. Valve element 192 has spaced valve lands 196, 198 and 200. It is urged in an upward direction by valve spring 202.

Exhaust port 204 communicates with the chamber 194 intermediate the lands 196 and 198. Passage 84 communicates with the chamber 194 intermediate the lands 198 and 194. A pressure feedback passage 206 extends from passage 84 to the upper side of the land 196. A differential area is established by reason of the differential diameter of lands 196 and 198. The valve element 192 thus can modulate the pressure in passage 84, the magnitude of the modulation being determined by the calibration of the spring 202.

Control pressure passage 84 includes a branch passage 208 in which is located in series relationship a pair of orifices 210 and 212. Flow through the passage 208 and through the orifices is controlled by solenoid valve element 214. It is normally spring-urged to a passage blocking position by valve spring 216. It is urged in the right hand direction to an open-passage position by solenoid windings 218.

Control signal passage 220 communicates with the valve chamber 194 adjacent the lower end of the valve element 192. The pressure that is developed in passage 220 complements the force of the valve spring 202. The higher the pressure in passage 220, the greater will be the regulated line pressure.

Passage 220 communicates through regulator valve 222 with signal passage 224 which in turn communicates with the passage 208. When the valve element 214 is shifted in the right hand direction, flow is established through the orifices 210 and 212. If the orifices 210 and 212 are of equal size, the pressure that exists between them is equal to one-half of the pressure on the left hand side of the orifice 210. If desired, regulator valve 222 can be calibrated to modulate or vary the value of this pressure in passage 224 before it is distributed from passage 224 to passage 220. In either case, the pressure acting to supplement the spring action of spring 202 is determined by the pressure in passage 224, which in turn is determined by the pressure drop across the orifices in passage 208.

When the valve element 214 is continuously open, the pressure in passage 220 is a minimum. This establishes one of the limiting parameters. On the other hand, when the valve element 214 is fully closed, pressure from passage 224 is a maximum. This establishes the other extreme for the parameter that controls the operation of the regulator valve. If the valve 214 is opened and closed by distributing to solenoid windings 218 a pulsating electrical voltage signal, the magnitude of the pressure in passage 224 can be varied between these two extreme limits. The higher the pulsing rate, the higher the pressure build-up in passage 224.

Figure 4:
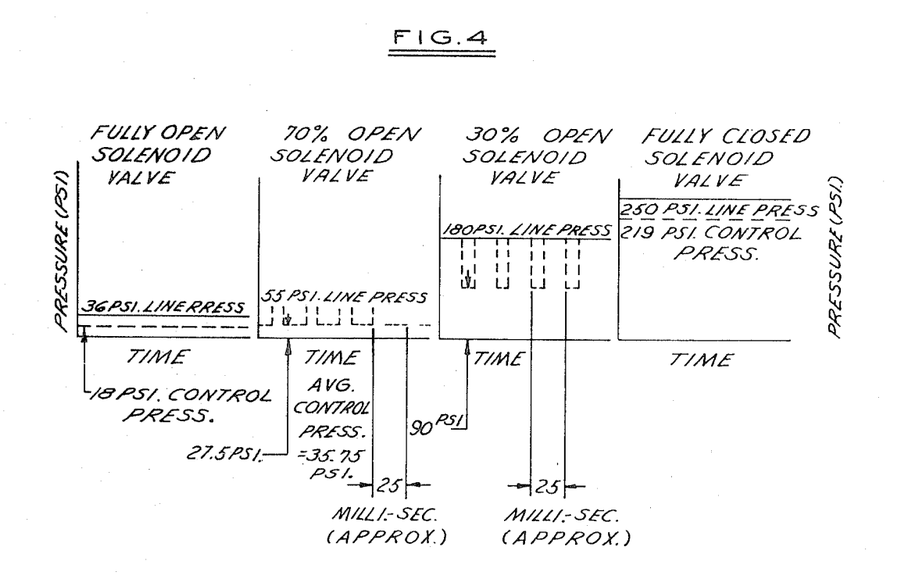
FIG. 4 shows the relationship between the pulsing frequency of the pulse valve and the magnitude of the regulated line pressure established by the regulator valve of my invention.

In the chart of FIG. 4 I have shown four graphs for various operating conditions. In the left hand graph a minimum line pressure 36 p.s.i. is maintained when the valve is fully opened. At that time, the control pressure measured on the ordinate of the graph is equal to 18 p.s.i. If the solenoid windings 218 are subjected to a pulsating voltage input, a pulsating pressure in passage 224 will be established. The average of these pressures as seen in the second chart in FIG. 4 will be 35.75 p.s.i. thus resulting in an effective line pressure of 55 p.s.i.

If the rate of the pulsation increases, the pressure build-up in passage 224 is increased accordingly. In this instance an effective signal pressure of 90 p.s.i. is established thereby resulting in an effective regulated line pressure of 180 p.s.i. The right hand chart of FIG. 4 illustrates the extreme condition where the valve 214 is closed continuously. Because of leakage, the pressure in passage 224 may be somewhat less than the regulated line pressure, which in this instance is 250 p.s.i.

An electronic line pressure sensor 226, as seen in FIG. 3, communicates with the line pressure passage 84 and develops an electrical signal which is distributed back to the control module. This is indicated schematically in FIG. 2. It provides the necessary feed-back for effective pressure regulation.

The electronically controlled module develops a proper pulsating frequency which is dictated by the three input parameters; namely, the output speed engine, manifold vacuum and the range selection.

It is necessary in a circuit of this type to provide a cut-back in line pressure as the vehicle is accelerated from a standing start. A high initial pressure is required at stall at provide sufficient torque transmitting capacity for the clutches and brakes as the converter multiplies the input torque. After the acceleration of the vehicle has reached an intermediate value, the torque ratio of the converter is reduced and the torque transmitting requirements of the clutches and the brakes is reduced. It is desirable at this time to reduce the circuit pressure in order to condition the clutches and brakes for smooth transmission ratio shifts. Excessive pressure under these conditions will result in an unduly harash shift. The control module therefore senses the upshift speed and at a predetermined value causes a so-called cut-back in the pressure to occur. The magnitude of the cut-back pressure then will vary with engine manifold vacuum along a line which is indicated in FIG. 5.

Figure 5:
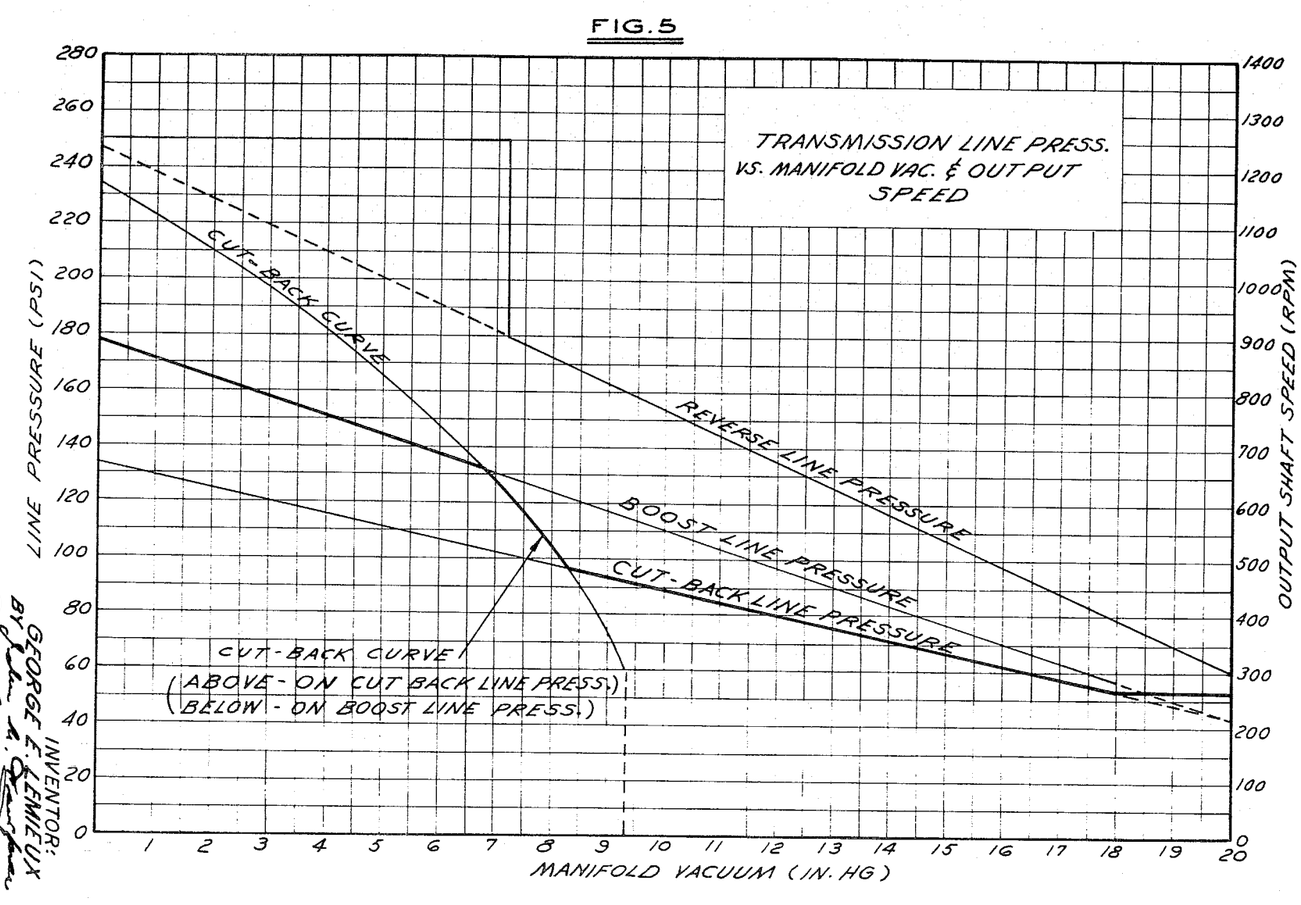
FIG. 5 is a performance chart showing the relationship of engine manifold pressure to line pressure.

In the chart of FIG. 5 one variable is identified by the reference legend "boost line pressure." The shift point at which the cut-back occurs is indicated by the curve in the chart of FIG. 5 identified by the reference legend "cut-back curve."

An increase in the circuit pressure is necessary also to accommodate reverse torque delivery. At that time the reverse brake must be applied because the overrunning brake 62 is incapable of accommodating reverse torque reaction. A typical reverse line pressure curve is illustrated in the chart of FIG. 5.

Having thus described a preferred form of my invention, what I claim and desire to secure by U.S. Letters Patent is.

I claim:

1. In a power transmission mechanism having fluid pressure operated clutches and brakes adapted to establish torque ratio changes, a pressure source, conduit structure connecting the pressure source with the servos, multiple shift valve elements situated in and partly defining the conduit structure and a regulator valve system for maintaining a precalibrated pressure level in said servos, said regulator valve system comprising a movable valve element, a pulse valve, a signal passage extending from a high pressure region of said system to a low pressure region, a flow orifice in said signal passage, the upstream side of said flow orifice communicating with said regulator valve system, said pulse valve registering with said signal passage and adapted to block the same when it is urged in one direction and to open the same when it is moved in the opposite direction, electrical control means for developing a pulsating electrical voltage the frequency of which is influenced by control voltage signals, solenoid windings connected to said electrical control means and surrounding portions of said pulse valve, said pulse valve moving into and out of registry with said signal passage at a rate that is determined by the pulsating frequency of electrical voltage applied to said solenoid windings by said control means whereby the effective pressure made available to said regulator valve is functionally related to the voltage frequency.

2. The combination as set forth in claim 1 wherein said signal passage includes a pair of series related control orifices, a hydraulic connection between said regulator valve and the region of said signal passage intermediate said orifices, said pulse valve registering with said signal passage on the downstream side of the downstream orifice.

3. The combination as set forth in claim 1 wherein said regulator valve comprises a movable valve spool, a valve chamber receiving said valve spool, a low pressure exhaust port communicating with said valve chamber, said pressure source communicating with said valve chamber at a location axially spaced from said exhaust port, said valve element having valve lands adapted to block communication between said exhaust port and said signal passage when it assumes one position and opening such communication when it assumes a second position, a valve spring normally urging said valve element toward said first position, said signal passage communicating with said valve chamber in the region thereof occupied by said valve spring.

4. The combination as set forth in claim 2 wherein said regulator valve comprises a movable valve spool, a valve chamber receiving said valve spool, a low pressure exhaust port communicating with said valve chamber, said pressure source communicating with said valve chamber at a location axially spaced from said exhaust port, said valve element having valve lands adapted to block communication between said exhaust port and said signal passage when it assumes one position and opening such communication when it assumes a second position, a valve spring normally urging said valve element toward said first position, said signal passage communicating with said valve chamber in the region thereof occupied by said valve spring.

5. The combination as set forth in claim 1 wherein each of said shift valve elements have two operating positions, each valve element being slidably situated in a valve chamber, a valve spring acting on each valve element to urge the same toward one of said operating positions, solenoid valve means for triggering shifting movement of said valve elements comprising a control passage extending from one end of said valve chamber to said pressure source, a movable solenoid valve element registering with said control passage to block the same when it assumes one position and solenoid windings encircling portions of said movable solenoid valve element and effective to move the latter to a control passage opening position when it is energized.

6. The combination as set forth in claim 2 wherein each of said shift valve elements have two operating positions, each valve element being slidably situated in a valve chamber, a valve spring acting on each valve element to urge the same toward one of said operating positions, solenoid valve means for triggering shifting movement of said valve elements comprising a control passage extending from one end of said valve chamber to said pressure source, a movable solenoid valve element registering with said control passage to block the same when it assumes one position and solenoid windings encircling portions of said movable solenoid valve element and effective to move the latter to a control passage opening position when it is energized.

7. The combination as set forth in claim 3 wherein each of said shift valve elements have two operating positions, each valve element being slidably situated in a valve chamber, a valve spring acting on each valve element to urge the same toward one of said operating positions, solenoid valve means for triggering shifting movement of said valve elements comprising a control passage extending from one end of said valve chamber to said pressure source, a movable solenoid valve element registering with said control passage to block the same when it assumes one position and solenoid windings encircling portions of said movable solenoid valve element and effective to move the latter to a control passage opening position when it is energized.

8. The combination as set forth in claim 4 wherein each of said shift valve elements have two operating positions, each valve element being slidably situated in a valve chamber, a valve spring acting on each valve element to urge the same toward one of said operating positions, solenoid valve means for triggering shifting movement of said valve elements comprising a control passage extending from one end of said valve chamber to said pressure source, a movable solenoid valve element registering with said control passage to block the same when it assumes one position and solenoid windings encircling portions of said movable solenoid valve element and effective to move the latter to a control passage opening position when it is energized.

References Cited
UNITED STATES PATENTS

| | | | |
|---|---|---|---|
| 2,910,884 | 11/1959 | Peras | 74—866 |
| 3,267,762 | 8/1966 | Reval | 74—866 X |
| 3,448,640 | 6/1969 | Nelson | 74—866 |
| 3,505,907 | 4/1970 | Fox et al. | 74—753 |

ARTHUR T. McKEON, Primary Examiner

U.S. Cl. X.R.

74—866, 869

UNITED STATES PATENT OFFICE
CERTIFICATE OF CORRECTION

Patent No. 3,621,735         Dated November 23, 1971

Inventor(s)          G. E. Lemieux

It is certified that error appears in the above-identified patent and that said Letters Patent are hereby corrected as shown below:

Column 7, line 47, cancel "clutches and brakes" and substitute --clutch and brake servos--.

Signed and sealed this 24th day of April 1973.

(SEAL)
Attest:

EDWARD M. FLETCHER, JR.          ROBERT GOTTSCHALK
Attesting Officer                Commissioner of Patents

UNITED STATES PATENT AND TRADEMARK OFFICE
CERTIFICATE OF CORRECTION

PATENT NO. : 3,621,735

DATED : November 23, 1971

INVENTOR(S) : G. E. Lemieux

It is certified that error appears in the above-identified patent and that said Letters Patent are hereby corrected as shown below:

Column 1, line 18, cancel "frequency" and substitute --timing--; line 20, cancel "frequency" and substitute --timing--; line 51, cancel "selectievly" and substitute --selectively--; line 65, cancel "rate" and substitute --timing--.

Column 2, line 63, cancel "60" and substitute --64--.

Column 6, line 57, cancel "rate" and substitute --time--; line 69, cancel "rate" and substitute --time--.

Column 7, line 10, after "frequency" insert --and timing--; line 62, cancel "frequency" and substitute --timing--; line 71, cancel "frequency" and substitute --timing--.

Signed and Sealed this

Twenty-second Day of May 1979

[SEAL]

Attest:

RUTH C. MASON
Attesting Officer

DONALD W. BANNER
Commissioner of Patents and Trademarks